US008483919B2

(12) United States Patent
Byerly et al.

(10) Patent No.: US 8,483,919 B2
(45) Date of Patent: Jul. 9, 2013

(54) DOUBLE TRANSITION SHIFT CONTROL IN AN AUTOMATIC POWERSHIFTING TRANSMISSION

(75) Inventors: John Andrew Byerly, Indianapolis, IN (US); John P. Kresse, Martinsville, IN (US); Mark A. Rains, Avon, IN (US); Jeffrey K. Runde, Fishers, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 13/294,551

(22) Filed: Nov. 11, 2011

(65) Prior Publication Data

US 2012/0123654 A1     May 17, 2012

Related U.S. Application Data

(60) Provisional application No. 61/412,961, filed on Nov. 12, 2010.

(51) Int. Cl.
    *G06F 7/00*          (2006.01)

(52) U.S. Cl.
    USPC .......................................................... 701/60

(58) Field of Classification Search
    USPC .......................................................... 701/60
    See application file for complete search history.

(56) References Cited

U.S. PATENT DOCUMENTS

| | | | |
|---|---|---|---|
| 4,989,477 A | 2/1991 | Hunter et al. | |
| 5,014,573 A | 5/1991 | Hunter et al. | |
| 5,038,636 A | 8/1991 | Vukovich et al. | |
| 5,050,458 A | 9/1991 | Vukovich et al. | |
| 5,097,726 A * | 3/1992 | Asada | 477/121 |
| 5,113,343 A | 5/1992 | Hunter et al. | |
| 5,335,566 A | 8/1994 | Genise et al. | |
| 5,467,854 A | 11/1995 | Creger et al. | |
| 6,042,504 A | 3/2000 | Gualtieri et al. | |
| 6,332,860 B1 | 12/2001 | Hubbard et al. | |
| 6,364,811 B1 | 4/2002 | Hubbard et al. | |
| 6,370,463 B1 * | 4/2002 | Fujii et al. | 701/51 |
| 6,656,087 B1 | 12/2003 | Runde et al. | |
| 6,659,902 B1 | 12/2003 | Ehrlinger | |
| 6,869,382 B2 | 3/2005 | Leising et al. | |
| 6,958,028 B2 | 10/2005 | Janson et al. | |
| 6,961,646 B2 * | 11/2005 | Soliman et al. | 701/51 |

(Continued)

OTHER PUBLICATIONS

"Development of Output Torque Equation for Double Swap Shift Control"—SAE Technical Paper Series 2007-01-1308; Authors, Hussein Dourra, David Kwapis; Pub. Apr. 16, 2007.

(Continued)

*Primary Examiner* — Mary Cheung
*Assistant Examiner* — Michael Berns
(74) *Attorney, Agent, or Firm* — Woodard, Emhardt, Moriarty, McNett & Henry LLP

(57) ABSTRACT

A system and method for controlling double transition shifts in an automatic transmission having multiple gear sections. During a double transition shift, the system performs simultaneous closed loop control of the primary oncoming clutch in the primary gear section and the secondary off-going clutch of the secondary gear section. Before the input shaft of the secondary gear section is fully pulled down or the secondary off-going clutch becomes overheated, the system switches closed loop control of the input shaft to the secondary oncoming clutch of the secondary gear section. The system utilizes model-based calculations to determine the initial clutch pressure settings when a clutch enters closed loop control.

36 Claims, 12 Drawing Sheets

U.S. PATENT DOCUMENTS

| | | |
|---|---|---|
| 7,070,534 B2 | 7/2006 | Pelouch |
| 7,097,584 B2 | 8/2006 | Kuhstrebe |
| 7,104,917 B2 | 9/2006 | Klemem et al. |
| 7,115,069 B2 | 10/2006 | Soliman et al. |
| 7,128,678 B2 | 10/2006 | Dourra et al. |
| 7,179,189 B2 | 2/2007 | Dourra et al. |
| 7,216,025 B2 * | 5/2007 | Keyse et al. .................. 701/61 |
| 7,282,012 B2 | 10/2007 | Soliman et al. |
| 7,367,919 B2 | 5/2008 | Fahland et al. |
| 7,491,152 B2 | 2/2009 | Fowler et al. |
| 7,509,885 B2 | 3/2009 | Gerlofs et al. |
| 7,527,578 B2 | 5/2009 | Soliman et al. |
| 7,559,876 B2 | 7/2009 | Runde et al. |
| 7,587,957 B2 | 9/2009 | Jackson |
| 7,597,644 B2 | 10/2009 | Rodgers |
| 7,608,013 B2 | 10/2009 | Chen |
| 7,621,839 B2 | 11/2009 | Jackson |
| 7,624,658 B2 | 12/2009 | Fahland et al. |
| 7,632,215 B2 | 12/2009 | Dourra et al. |
| 7,662,063 B2 | 2/2010 | Schnitzer |
| 7,736,269 B2 | 6/2010 | Long |
| 8,075,437 B2 * | 12/2011 | Rodgers, II .................... 475/211 |
| 8,255,130 B2 * | 8/2012 | Fujii et al. ........................ 701/55 |
| 2006/0166786 A1 | 7/2006 | Baasch et al. |
| 2008/0045373 A1 | 2/2008 | Rodgers |
| 2008/0092681 A1 | 4/2008 | Remmler |
| 2008/0125267 A1 | 5/2008 | Dourra et al. |
| 2008/0190228 A1 | 8/2008 | Long et al. |
| 2008/0236317 A1 * | 10/2008 | Matsushita et al. ............. 74/340 |
| 2009/0118088 A1 | 5/2009 | Baldwin |
| 2009/0255370 A1 | 10/2009 | Remmler |
| 2009/0264241 A1 | 10/2009 | Dittrich et al. |
| 2010/0016115 A1 | 1/2010 | Braford |
| 2010/0023230 A1 | 1/2010 | Holmes |
| 2010/0029431 A1 | 2/2010 | Rodgers |
| 2010/0318269 A1 * | 12/2010 | Yanakiev et al. ................ 701/55 |

OTHER PUBLICATIONS

International Patent Application PCT/US2011/060311 Search Report and Written Opinion Mailed May 21, 2012.

* cited by examiner

|  | CLUTCH | | | | | | |
|---|---|---|---|---|---|---|---|
| RANGE | C1 | C2 | C3 | C4 | C5 | C6 | C7 |
| 1st | X |  |  |  |  | X |  |
| 2nd |  | X |  |  |  | X |  |
| 3rd |  |  | X |  |  | X |  |
| 4th |  |  |  | X |  | X |  |
| 5th |  |  |  |  | X | X |  |
| 6th | X |  |  |  |  |  | X |
| 7th |  | X |  |  |  |  | X |
| 8th |  |  | X |  |  |  | X |
| 9th |  |  |  | X |  |  | X |
| 10th |  |  |  |  | X |  | X |

*Fig. 2*

DOUBLE TRANSITION SHIFT CONTROL IN AN AUTOMATIC POWERSHIFTING TRANSMISSION

CROSS REFERENCE TO RELATED APPLICATIONS

This application claims the benefit of U.S. Provisional Patent Application No. 61/412,961 filed Nov. 12, 2010, which is hereby incorporated by reference.

BACKGROUND

The present invention generally relates to a vehicle transmission control system and, more particularly, to a system and method for controlling double transition shifts in transmissions which utilize multiple gearing sections.

Motor vehicles require a transmission between the vehicle engine or motor and the output drive elements in order to optimize efficiency and provide the desired torque and acceleration characteristics under varying driving conditions while maintaining the engine or motor within operational speeds. A typical transmission includes a number of individual gear elements which may be selectively engaged using a corresponding set of individual clutches. The combination of activated clutches determines the overall speed ratio between the input and output shafts of the transmission. In a simple transmission, a shift from a current speed ratio to a new speed ratio involves disengaging a first clutch, known as the off-going clutch, and engaging a second clutch, known as the on-coming clutch. In certain applications, however, the transmission may comprise multiple gearing sections with an intermediate shaft therebetween in order to optimize manufacturing costs, size, or other operational parameters.

The use of multiple gearing sections may result in at least one instance where multiple clutches in the transmission are being engaged or disengaged at the same time in order to achieve a desired change in the overall speed ratio of the transmission. For example, in a ten-speed transmission comprising a five-speed range pack followed by a two-speed splitter unit, the shift from fifth to sixth gear involves the coordination of four clutches: the off-going and on-coming clutches in the range pack, as well as the off-going and on-coming clutches in the splitter unit. These shifts, commonly referred to as double transition shifts, are more difficult to control due to the complex interactions between the simultaneous shifts in the range pack and splitter unit. Furthermore, a double transition shift often requires that one transmission section (e.g., the range pack) be shifted from its highest gear ratio to its lowest gear ratio, which can result in excess heat buildup in the clutch elements. One known method for dealing with the problem is to simply speed up the rate of the shift, thereby reducing the time available for heat to build up in the clutches.

However, many transmission control systems utilize what is known as "power on shifting" where there is very little, if any, decrease in delivered output torque during a transmission shift and the shifts are completed in a shorter amount of time. This increases the efficiency and responsiveness of the transmission, but also makes control of the various clutches and other transmission elements more difficult, particularly in the case of double transition shifts. Systems and methods are therefore needed which improve shift quality and reduce strain on the transmission elements during double transitions shifts.

SUMMARY

According to one aspect of the present disclosure, a transmission control system is presented which utilizes at least three speed sensors in order to optimize the control of individual clutches during double transition power-on shifts while still achieving a desired acceleration profile. The speed sensors may be located on the transmission input shaft, on an intermediate shaft between the transmission gear sections, and on the output shaft of the transmission. The transmission control system may further utilize simultaneous closed loop control for both of the shifts involved in a double transition shift.

According to another aspect of the disclosure, the transmission control system utilizes closed loop control of the intermediate shaft speed by applying the proper amount of pressure to the primary on-coming clutch in a primary section of the transmission to ensure that the primary on-coming clutch is fully locked up (no longer slipping) before the secondary off-going clutch in a secondary section of the transmission becomes overheated. Once the primary on-coming clutch is locked up, the system switches closed loop control of the input shaft speed from the secondary off-going clutch to the secondary on-coming clutch in the secondary transmission section. In addition to real-time closed loop control, the system may utilize model-based calculations to determine the initial clutch pressures or torques necessary to achieve lockup of the intermediate shaft prior to the secondary off-going clutch reaching its thermal limits. This allows the transmission clutch elements to be manufactured to lower thermal and performance standards while at the same time, allowing the optimization of shifts during double transition events.

According to another aspect of the disclosure, a method for controlling a double transition upshift in an automatic transmission of a vehicle powertrain is presented. Closed loop control of an intermediate shaft speed is performed using a primary on-coming clutch in a primary gear section of the automatic transmission to achieve pull-down of the intermediate shaft. The primary gear section is connected to an output shaft and the intermediate shaft. The intermediate shaft is connected between the primary gear section and a secondary gear section of the automatic transmission. While the intermediate shaft is being pulled down, closed loop control of an input shaft speed is performed using a secondary off-going clutch in the secondary gear section to achieve partial pull-down of the input shaft. The input shaft is connected between the secondary gear section and a power generation unit of the vehicle. The secondary off-going clutch is released and closed loop control of the input shaft speed is performed using a secondary on-coming clutch in the secondary gear section to complete the pull-down of the input shaft. The secondary off-going clutch may be exhausted before the secondary off-going clutch reaches a thermal capacity threshold. Pull-down of the intermediate shaft is preferably completed before the secondary off-going clutch is exhausted. Initial closed-loop control setpoints for the clutches may be based on a model representing the estimated inertias within the transmission.

According to another aspect of the disclosure, a method for controlling a double transition downshift in an automatic transmission of a vehicle powertrain is presented. Closed loop control of an intermediate shaft speed is performed using a primary on-coming clutch in a primary gear section of the automatic transmission to achieve pull-up of the intermediate shaft. The primary gear section is connected to an output shaft and the intermediate shaft. The intermediate shaft is connected between the primary gear section and a secondary gear section of the automatic transmission. While the intermediate shaft is being pulled up, closed loop control of an input shaft speed is performed using a secondary off-going clutch in the secondary gear section to achieve partial pull-up of the input shaft. The input shaft is connected between the secondary gear section and a power generation unit of the vehicle. The secondary off-going clutch is released and closed loop control of the input shaft speed is performed using a secondary on-coming clutch in the secondary gear section to complete the pull-up of the input shaft. The secondary off-going clutch may be exhausted before the secondary off-going clutch reaches a thermal capacity threshold. Pull-up of the intermediate shaft is preferably completed before the secondary off-going clutch is exhausted. Initial closed-loop control setpoints for the clutches may be based on a model representing the estimated inertias within the transmission.

According to another aspect of the disclosure, a system for controlling a double transition upshift in an automatic transmission of a vehicle powertrain is presented, comprising a primary gear section of the automatic transmission, the primary gear section connected to an output shaft, a secondary gear section of the automatic transmission, and an intermediate shaft connected between the primary gear section and secondary gear section. An input shaft is connected between the secondary gear section and a power generation unit of the vehicle. A torque converter may be connected between the input shaft and the power generation unit. A processor-based controller is in operative communication with the primary and secondary gear sections. The controller is configured to perform closed loop control of the intermediate shaft speed during the double transition upshift using a primary on-coming clutch in the primary gear section to achieve pull-down of the intermediate shaft. The controller is further configured to perform closed loop control of the input shaft speed using a secondary off-going clutch in the secondary gear section to achieve partial pull-down of the input while the intermediate shaft is being pulled down. The controller is further configured to release the secondary off-going clutch and perform closed loop control of the input shaft speed using a secondary on-coming clutch in the secondary gear section to complete the pull-down of the input shaft. The controller may also be configured to exhaust the secondary off-going clutch before the secondary off-going clutch reaches a thermal capacity threshold. The controller may further be configured to substantially complete pull-down of the intermediate shaft before the secondary off-going clutch is exhausted. The controller may also be configured to determine at least one initial clutch setpoint for closed loop control based on a model representing a plurality of estimated inertias within the transmission.

According to another aspect of the disclosure, a system for controlling a double transition downshift in an automatic transmission of a vehicle powertrain is presented, comprising a primary gear section of the automatic transmission, the primary gear section connected to an output shaft, a secondary gear section of the automatic transmission, and an intermediate shaft connected between the primary gear section and secondary gear section. An input shaft is connected between the secondary gear section and a power generation unit of the vehicle. A torque converter may be connected between the input shaft and the power generation unit. A processor-based controller is in operative communication with the primary and secondary gear sections. The controller is configured to perform closed loop control of the intermediate shaft speed during the double transition upshift using a primary on-coming clutch in the primary gear section to achieve pull-up of the intermediate shaft. The controller is further configured to perform closed loop control of the input shaft speed using a secondary off-going clutch in the secondary gear section to achieve partial pull-up of the input shaft while the intermediate shaft is being pulled up. The controller is further configured to release the secondary off-going clutch and perform closed loop control of the input shaft speed using a secondary on-coming clutch in the secondary gear section to complete the pull-up of the input shaft. The controller may also be configured to exhaust the secondary off-going clutch before the secondary off-going clutch reaches a thermal capacity threshold. The controller may further be configured to substantially complete pull-down of the intermediate shaft before the secondary off-going clutch is exhausted. The controller may also be configured to determine at least one initial clutch setpoint for closed loop control based on a model representing a plurality of estimated inertias within the transmission.

The above concept may be extended to transmissions having three or more gear sections. For example, transmissions having three gear sections may require a triple transition shift, where all three gear sections are being shifted simultaneously. In such cases, additional speed sensors may be added to monitor the additional shafts(s) connecting the transmission sections. Additionally, the closed loop control of the primary, secondary, and tertiary clutches may be switched from the off-going to the on-coming clutches in a cascaded fashion to avoid overheating of the off-going clutches.

Further forms, objects, features, aspects, benefits, advantages, and embodiments of the present invention will become apparent from a detailed description and drawings provided herewith.

BRIEF DESCRIPTION OF THE DRAWINGS

FIG. 2 is a table which lists the activated clutches for each available forward speed ratio in an example multi-unit transmission.

DESCRIPTION OF THE SELECTED EMBODIMENTS

Figure 1:
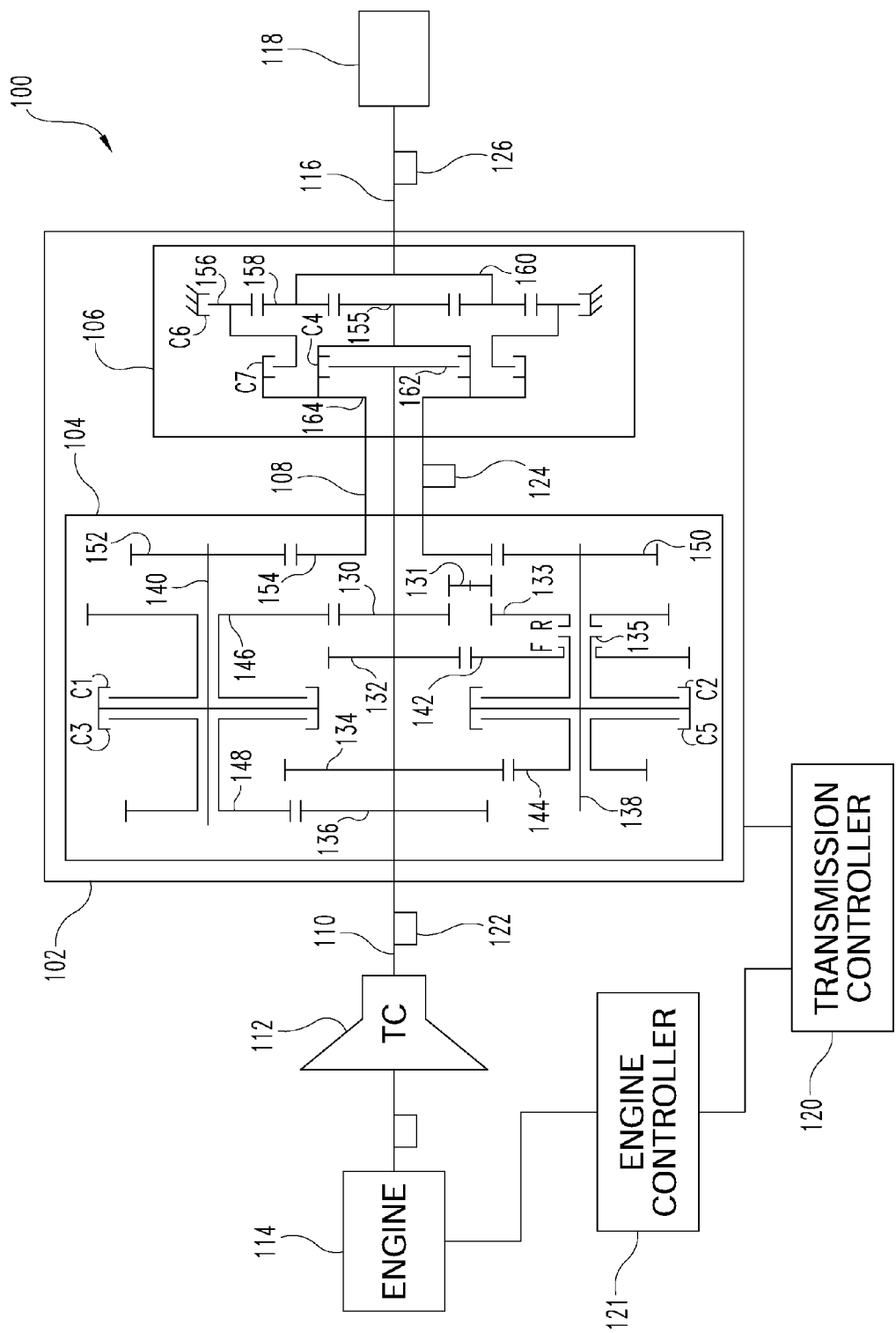
FIG. 1 illustrates a schematic diagram of a transmission and associated transmission control system according to one embodiment of the present disclosure.

For the purpose of promoting an understanding of the principles of the invention, reference will now be made to the embodiments illustrated in the drawings, and specific language will be used to describe the same. It will nevertheless be understood that no limitation of the scope of the invention is thereby intended. Any alterations and further modifications in the described embodiments and any further applications of the principles of the invention as described herein are contemplated as would normally occur to one skilled in the art to which the invention relates. One embodiment of the invention is shown in great detail, although it will be apparent to those skilled in the relevant art that some features not relevant to the present invention may not be shown for the sake of clarity.

FIG. 1 shows a diagrammatic view of a vehicle powertrain system 100 which may be controlled using the methods of the present disclosure. The control methods described herein are applicable to any type of vehicle powertrain requiring multiple transition shifts. It shall be understood that the transmission gear and control elements shown in FIG. 1 are merely one example of a multi-unit transmission system that may be controlled and that the principles of the present disclosure apply to the control of other types of compound transmission units as well. The system 100 illustrated in FIG. 1 is adapted for use in commercial-grade trucks as well as other types of vehicles, but it is envisioned that various aspects of the system 100 can be incorporated into other environments. For example, the described methods may be used to control transmissions which are connected to gasoline engines, electric motors, hybrid power sources, or any power device capable of powering a vehicle, pump, or generator via a transmission.

As shown, the system 100 may include a transmission 102, a power generation unit (such as engine 114), torque converter 112, vehicle drive elements 118, transmission control unit 120, and engine control unit 121.

Transmission 102 includes a countershaft gearset 104 and a planetary gearset 106. The physical architecture of the illustrated transmission 102 is similar to that described in U.S. Pat. Application Publication No. 2010/0029431 to Rodgers, published Feb. 4, 2010, which is herein incorporated by reference in its entirety. Accordingly, the gear and control elements shown in FIG. 1 have been simplified for the sake of brevity, it being understood that further details regarding the illustrated transmission architecture may be found in the aforementioned publication.

The input shaft 110 is connected to and driven by the output of a turbine, shown here as a torque converter 112. The torque converter provides a fluidic coupling between the engine 114 and the transmission 102. Under certain conditions, the torque converter may also operate in a locked mode, in which the input and output sections of the converter become physically locked to reduce pumping losses and increase efficiency. The countershaft gearset 104 outputs torque to the planetary gearset 106 via the intermediate shaft 108. The planetary gearset 106 outputs torque to the vehicle drive elements 118 (e.g., wheels) via the output shaft 116.

Within the countershaft gearset 104, drive gears 130, 132, 134, 136 are coupled to and in common rotation with the input shaft 110. Countershaft gearset 104 also includes first and second countershafts 138, 140 which are generally parallel to input shaft 110. Range gears 142 and 144 are rotatable about and concentric with first countershaft 138, and further intermesh with drive gears 132 and 134 respectively. Range gears 146 and 148 are rotatable about and concentric with second countershaft 140, and further intermesh with drive gears 130 and 136 respectively. Gears 150 and 152 are in common rotation with first and second countershafts 138 and 140 respectively, and further intermesh with gear 154. Gear 154 is in common rotation with intermediate shaft 108, which is concentric with and rotatable about input shaft 110. Drive gear 130 also intermeshes with reverse idler 131, which in turn intermeshes with range gear 133. Range gear 133 is concentric with and rotatable about first countershaft 138. Synchronizer 135 is provided to provide selection between forward and reverse speed ranges. When synchronizer 135 is moved to the "F" position, it engages range gear 142 to provide a forward speed ratio. When synchronizer 135 is moved to the "R" position, it engages range gear 133 (which in turn engages reverse idler 131) to provide a reverse speed ratio.

Planetary gearset 106 includes a sun gear 155, a ring gear 156, a plurality of planetary gears 158 and a carrier 160 which is coupled for common rotation with output shaft 116. In addition, hubs 162 and 164 are disposed at the front of the planetary gearset 106 and are operatively coupled to input shaft 110 and intermediate shaft 108, respectively, as shown.

The countershaft gearset 104 and planetary gearset 106 contain a plurality of individual friction clutches C1-C7 as shown for selectively engaging the various gear elements within the countershaft and planetary gearsets 104, 106, thereby providing the desired input/output speed ratio of the transmission 102. For example, with clutch C1 fully engaged, range gear 146 is coupled to second countershaft 140, thereby transferring torque from the input shaft 110 to the intermediate shaft 108. With clutch C7 additionally engaged, torque from the intermediate shaft 108 is transferred to ring gear 156 and ultimately to output shaft 116 via planetary gears 158 and carrier 160.

Although the illustrated embodiment depicts a five-speed range pack (countershaft gearset 104) followed by a two-speed splitter (planetary gearset 106), other types of transmissions may be controlled using the principles of the present disclosure. In addition, the individual gearsets 104, 106 may comprise any type of transmission architecture known the art including, but not limited to, countershaft gearsets, planetary gearsets, and the like.

A transmission control unit 120 is included which is in operative communication with various sensors in the vehicle powertrain including, but not limited to, speed sensors 122, 124, and 126. Sensor 122 is connected to the transmission input shaft 110, sensor 124 is connected to the intermediate shaft 108, and sensor 126 is connected to the output shaft 116. The speed sensors 122-126 sense the angular velocity of the corresponding shafts and provide feedback to the transmission control unit 120 to aid in the control of the individual clutches that will be described hereinbelow. The transmission control unit 120 may also interface with or include hydraulic connections for actuating the clutches C1-C7 using various methods known in the art. In addition, the transmission control unit 120 may receive additional signals, such as engine output torque or engine speed, from other sensors or powertrain control components, including engine control unit 121.

In a typical embodiment, the transmission controller 120 and engine control unit 121 each comprise a computer having a processor, memory, and input/output connections. The transmission control unit 120 may also include hydraulic switching and actuating components for routing and controlling the flow of hydraulic fluid to the various clutches and transmission components. It shall be understood that additional elements may be included in the transmission control unit 120 and engine control unit 121 as required by the particular application.

FIG. 2 illustrates the states of the individual clutch elements for each of the ten forward speed ratios being provided by the transmission 102. From the first to fifth speed ratios, only one off-going and one on-coming clutch transition is required for each shift. However, the shift between the fifth and sixth gear ranges is a double transition shift, which involves an off-going (C5) and on-coming (C1) clutch in the countershaft gearset 104, as well as an off-going (C6) and on-coming (C7) clutch in the planetary gearset 106. One problem with this particular transition is that the speed ratio of the countershaft gearset 104 must be transitioned from its lowest ratio to its highest ratio in a single shift. If the off-going clutch (C5) were used as the main control element for pulling down the speed of the input shaft 110 during the shift, the resulting heat strain due to the large clutch slip speeds and input torque from power-on shifting could cause decreased component life or even catastrophic failure. This can be a particular problem if the countershaft gearset was originally designed for use as a single unit transmission requiring only incremental shifts.

FIGS. 3, 4, 5, 6, and 7 illustrate a method for controlling the individual clutch pressures during a double transition upshift according to one embodiment of the present disclosure. Because the planetary gearset 106 is in direct communication with the output shaft 116, the clutches C6 and C7 will be respectively referred to as the primary off-going and primary on-coming clutches involved in the control of the double transition upshift. Likewise, the clutches C1 and C5 will be respectively referred to as the secondary on-coming and secondary off-going clutches for the double transition upshift. However, it shall be appreciated that other types of gearing elements may be substituted for the planetary gearset 106 and countershaft gearset 104.

Figure 3:
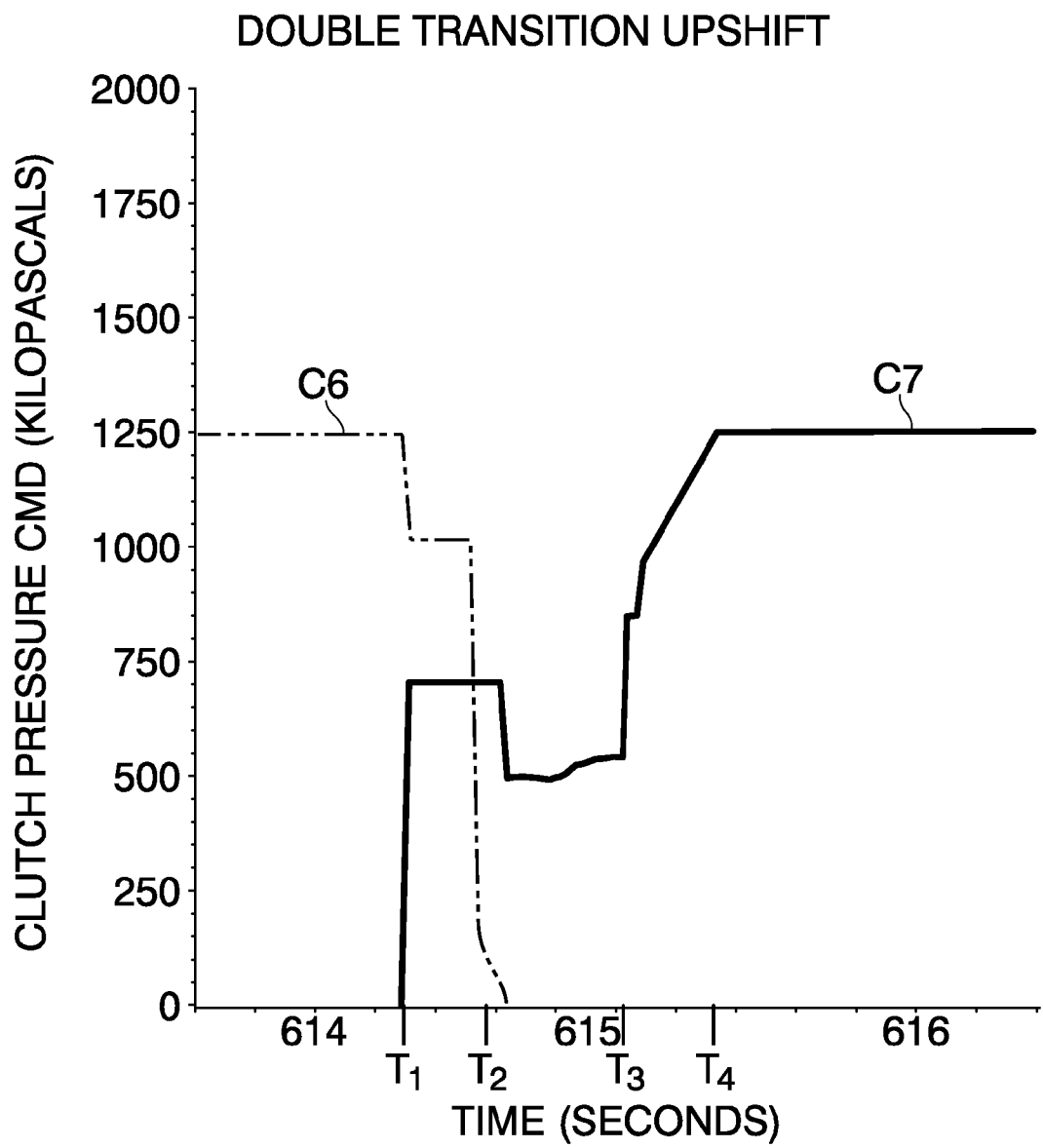
FIG. 3 is a diagram showing the timing of the pressure level commands in the primary on-coming and primary off-going clutches in the rear planetary gearset of the transmission of FIG. 1 during a double transition upshift according to one embodiment of the present disclosure.

Turning to FIG. 3, at time $T_1$, a shift from the fifth to sixth overall speed ratio is initiated by the transmission control unit 120. The transmission control unit 120 first increases the pressure of the primary oncoming clutch (C7) during a fill phase in order to synchronize the primary oncoming clutch's capacity with the secondary offgoing clutch (C5) slip for simultaneous shifts (e.g., the shift of the countershaft gearset 104). The pressure of the primary off-going clutch (C6) may also be lowered at time $T_1$ to allow for smoother control and predictable behavior when the primary off-going clutch (C6) needs to be exhausted. At approximately time $T_2$, the pressure in the primary oncoming clutch (C7) is commanded to a level which will begin to pull down the speed of the intermediate shaft 108 at a desired rate during an inertia phase. Also at approximately time $T_2$, the primary off-going clutch (C6) is exhausted, thereby relinquishing control of the intermediate shaft 108 speed to the primary oncoming clutch (C7). At this point, the speed of the intermediate shaft 108 is being mostly controlled by the primary oncoming clutch (C7) in a closed loop control mode which utilizes the intermediate shaft speed sensor 124 in a feedback loop.

Figure 4:
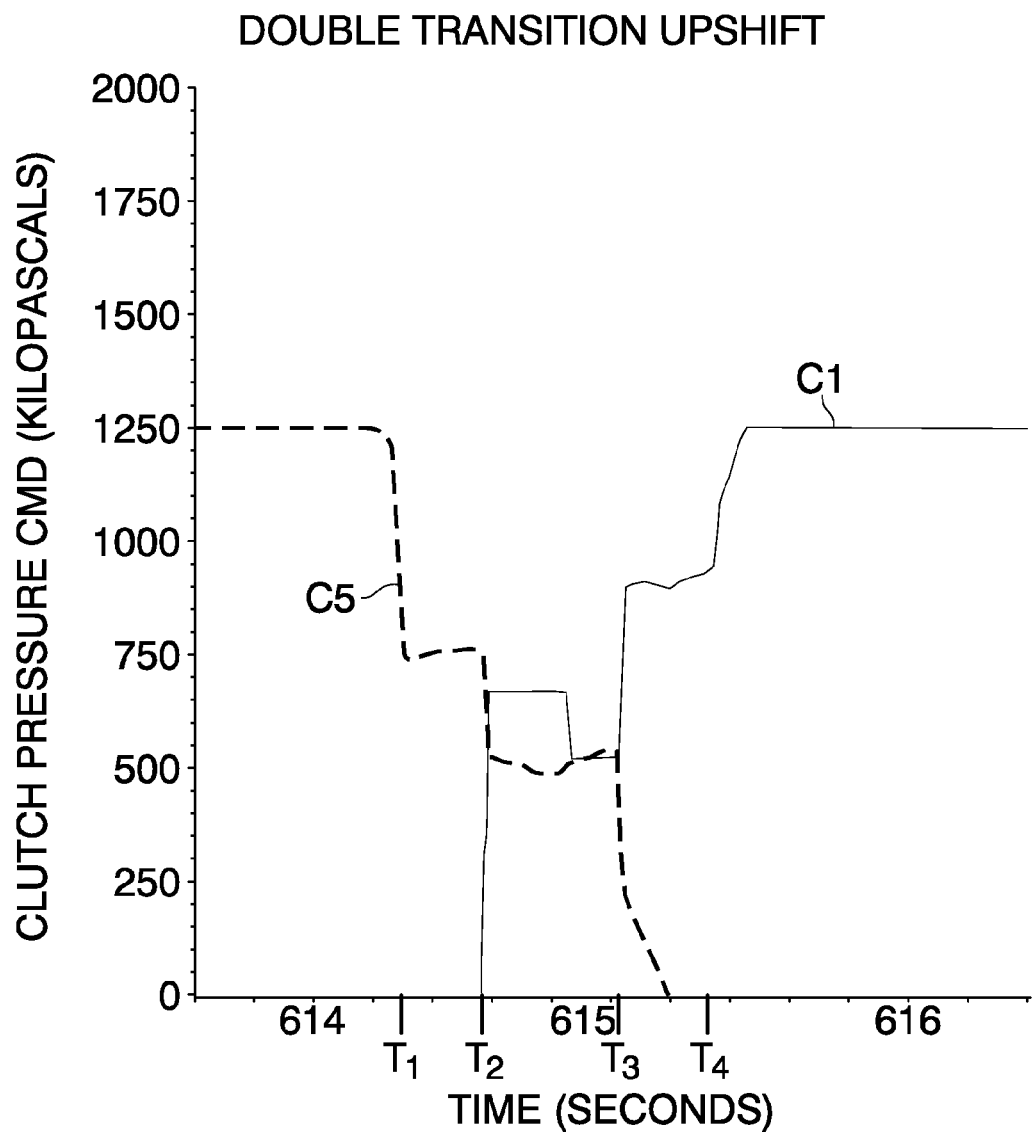
FIG. 4 is a diagram showing the timing of the pressure level commands in the secondary on-coming and off-going clutches in the countershaft gearset of the transmission of FIG. 1 during a double transition upshift according to one embodiment of the present disclosure.

As shown in FIG. 4, at time $T_2$, the transmission control unit 120 also lowers the pressure of the secondary off-going clutch (C5), thereby allowing the secondary off-going clutch (C5) to begin slipping and enter a closed loop control mode. The input shaft speed sensor 122 provides feedback for the control of the input shaft 110 speed. The secondary on-coming clutch (C1) enters a fill phase at this time as well. From time $T_2$ to $T_3$, both the primary oncoming clutch (C7) and the secondary off-going clutch (C5) are operating in closed loop control mode, with clutch C7 controlling the intermediate shaft 108 speed and clutch C5 controlling the input shaft 110 speed.

Figure 5:
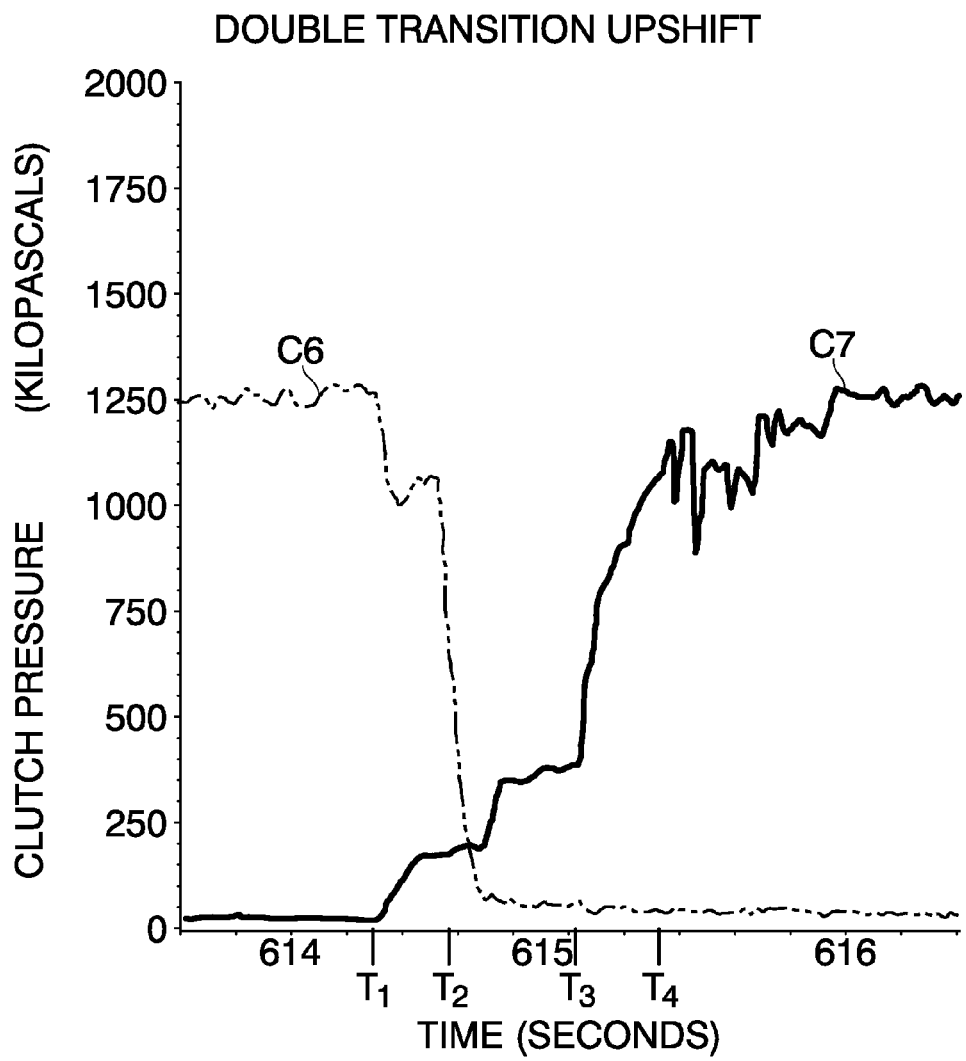
FIG. 5 is a diagram showing the timing of the resulting pressure levels in the primary on-coming and primary off-going clutches in the rear planetary gearset of the transmission of FIG. 1 during a double transition upshift according to one embodiment of the present disclosure.
Figure 6:
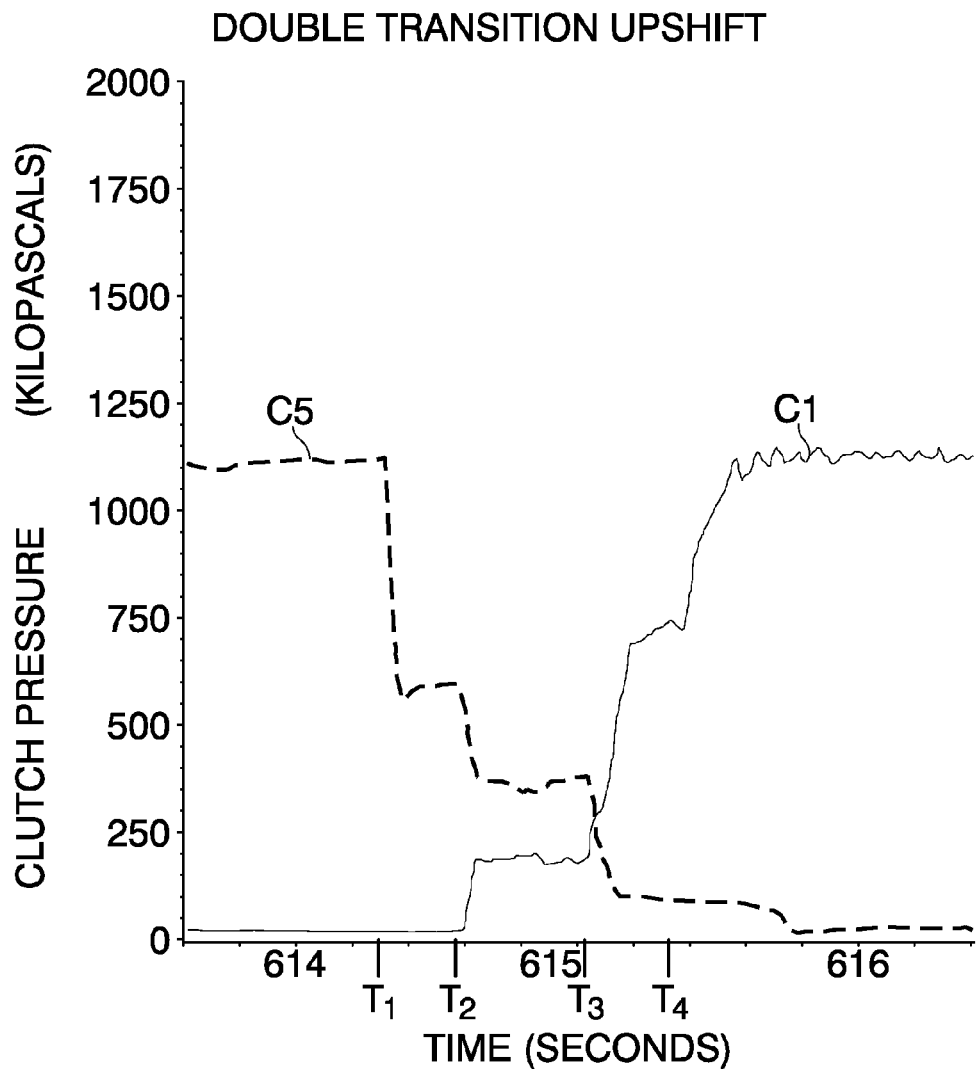
FIG. 6 is a diagram showing the timing of the resulting pressure levels in the secondary on-coming and off-going clutches in the countershaft gearset of the transmission of FIG. 1 during a double transition upshift according a one embodiment of the present disclosure.
Figure 7:
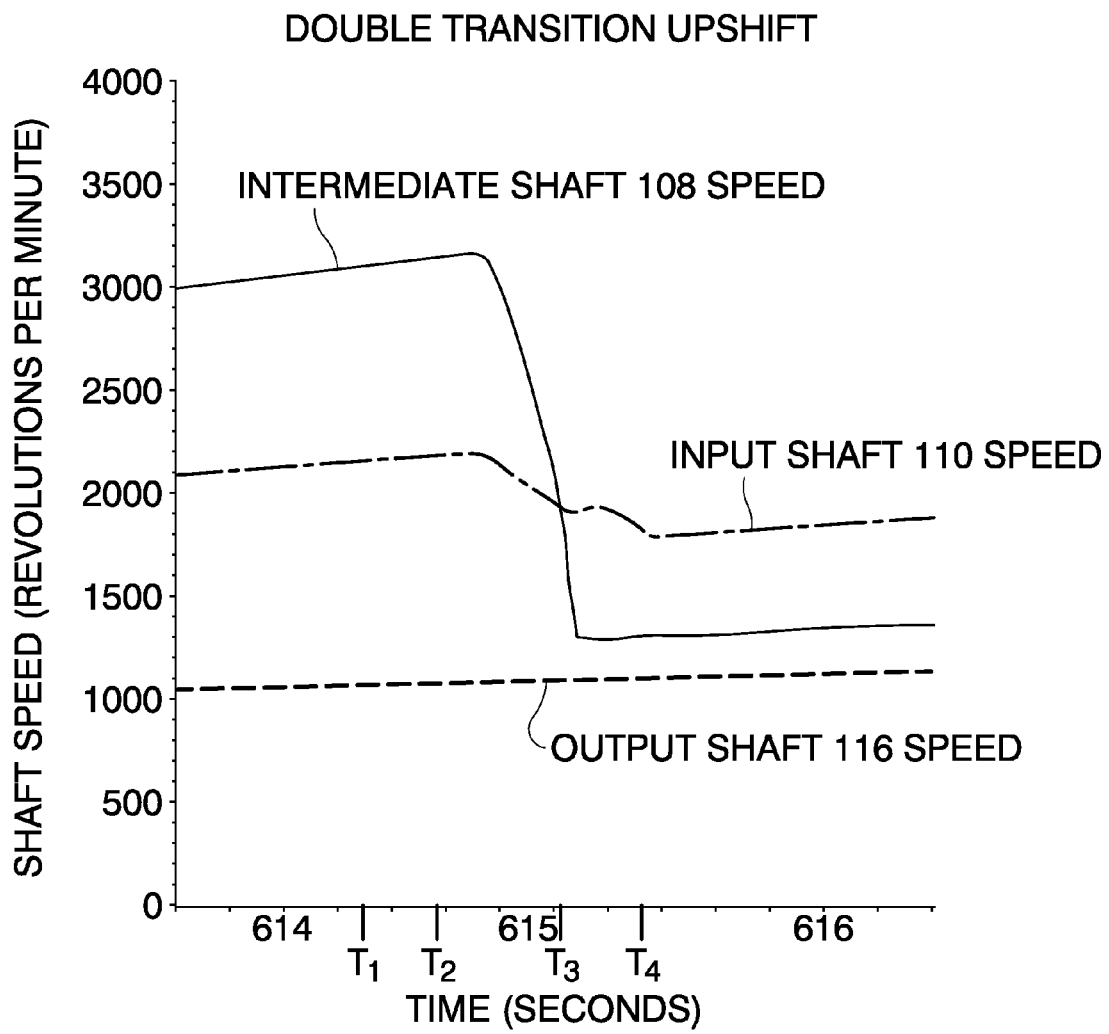
FIG. 7 is a diagram showing the resulting change in input shaft speed, intermediate shaft speed, and output shaft speed with time based on the controller clutch pressure commands of FIGS. 3 and 4.

Once the calculated slip speed of the secondary off-going clutch (C5) has exceeded a thermal capacity threshold (at time $T_3$ in FIG. 7), the secondary off-going clutch (C5) is exhausted. The pressure in the primary oncoming clutch (C7) is preferably controlled from time $T_2$ to $T_3$ to ensure that pull-down of the intermediate shaft 108 is also completed by time $T_3$, thereby preventing negative output torque on the output shaft 116. Since no clutch is acting against the primary oncoming clutch (C7) locking the intermediate shaft 108, the primary oncoming clutch (C7) locks up at time $T_3$. The secondary oncoming clutch (C1) is then set to a pressure level adequate for maintaining the continued pull-down and control of the input shaft 110. The transmission controller 120 maintains control of the input shaft 110 speed via the secondary coming clutch (C1) in a closed loop control mode (using input shaft speed sensor 122 as the feedback component) until time $T_4$ when pull down of the input shaft 110 is complete. By transitioning control of the input shaft 110 speed from the secondary off-going clutch (C5) to the secondary oncoming clutch (C1) before pull-down of the input shaft 110 is complete, the secondary off-going clutch (C5) is prevented from overheating or experiencing excessive wear. Additionally, the secondary oncoming clutch C1 has limited thermal impact due to low slip during its continued pull down of the input shaft 110. FIGS. 5 and 6 illustrate example corresponding clutch pressures which result from the clutch pressure command sequences of FIGS. 3 and 4.

FIGS. 8, 9, 10, 11, and 12 illustrate a method for controlling the individual clutch pressures during a double transition closed throttle downshift according to a further embodiment of the present disclosure. For the double transition downshift, clutch C7 will operate as the primary off-going clutch and clutch C6 will operate as the primary on-coming clutch. Likewise, clutch C1 will operate as the secondary off-going clutch and clutch C5 will operate as the secondary on-coming clutch.

Figure 8:
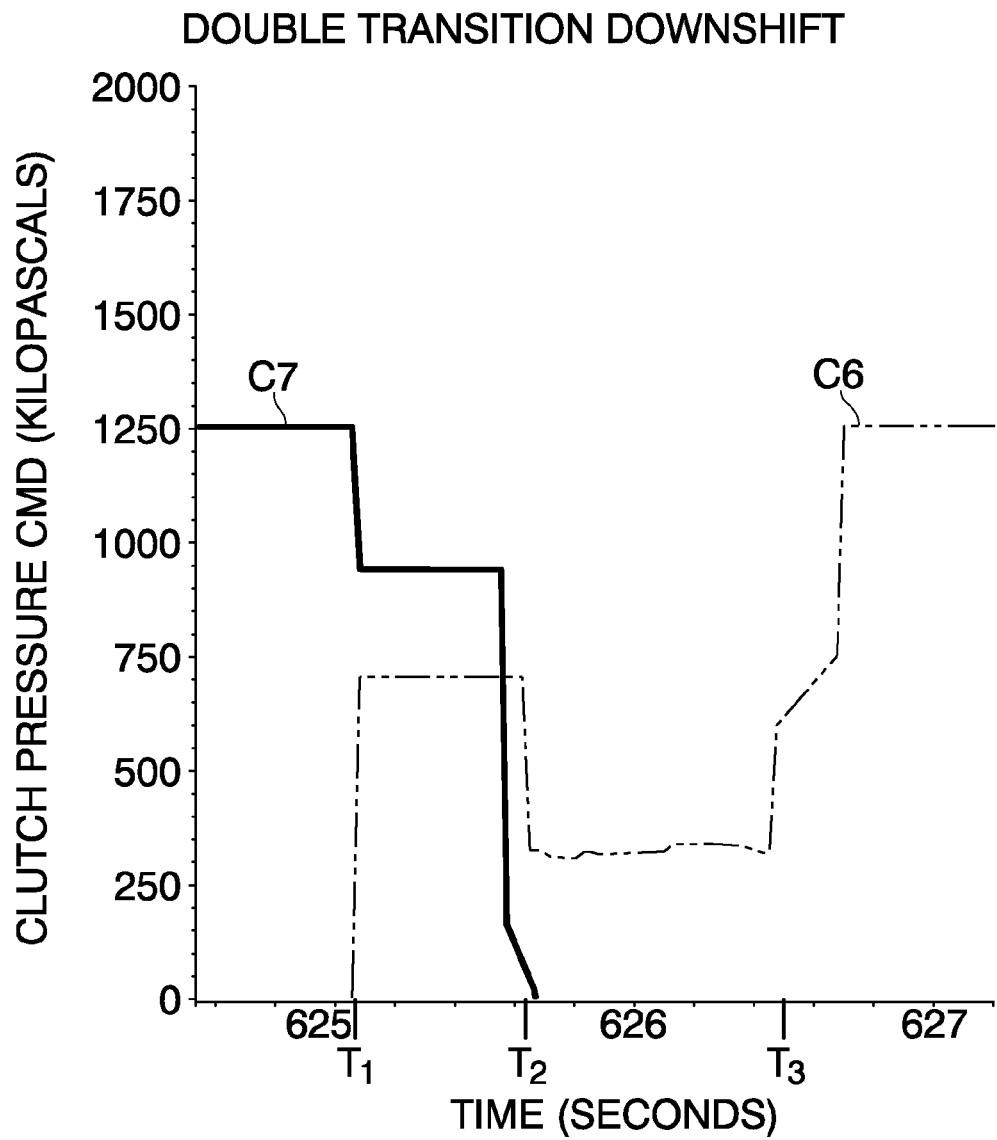
FIG. 8 is a diagram showing the timing of the pressure level commands in the primary on-coming and primary off-going clutches in the rear planetary gearset of the transmission of FIG. 1 during a double transition downshift according to one embodiment of the present disclosure.
Figure 9:
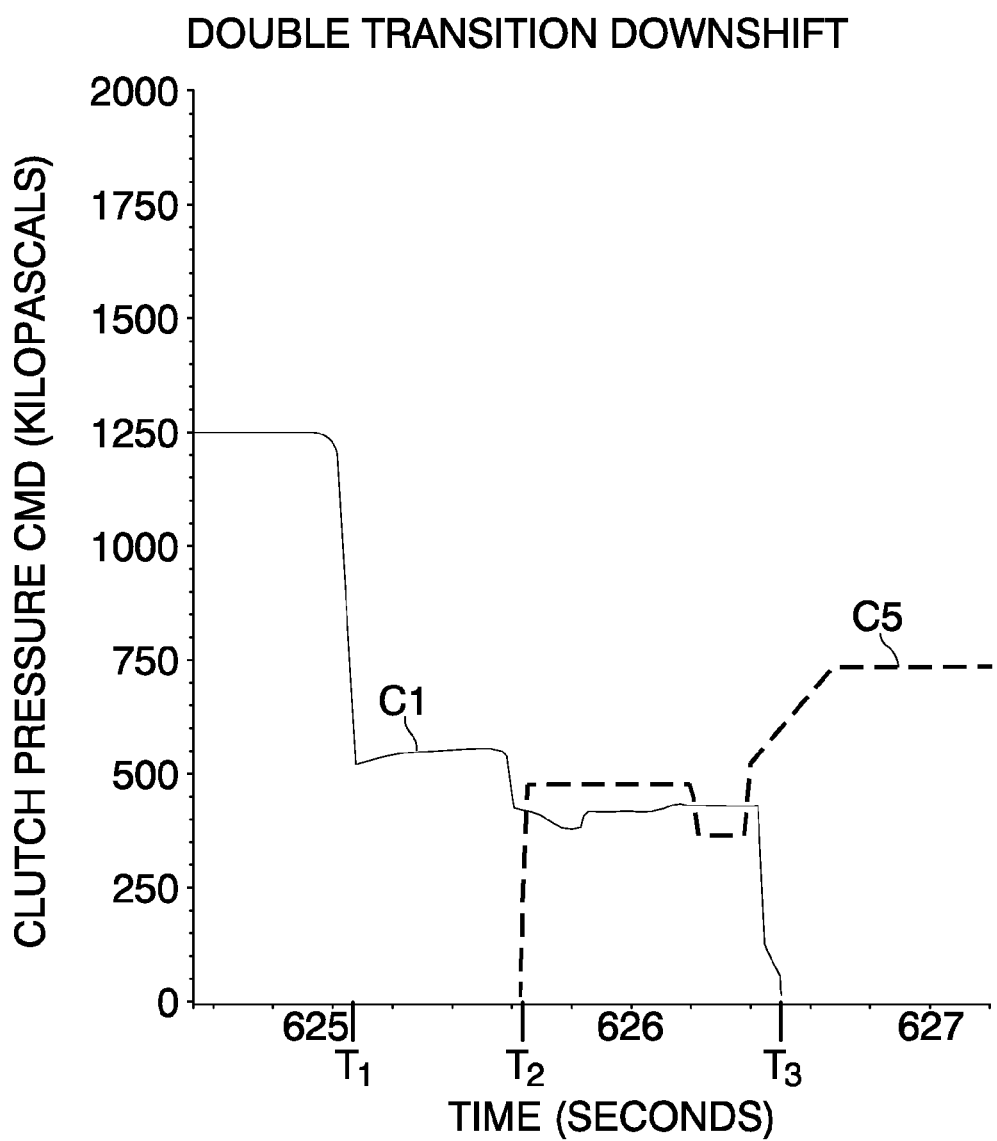
FIG. 9 is a diagram showing the timing of the pressure level commands in the secondary on-coming and off-going clutches in the countershaft gearset of the transmission of FIG. 1 during a double transition downshift according to one embodiment of the present disclosure.

As shown in FIG. 8, the primary on-coming clutch (C6) begins a fill phase at time $T_1$ when the double transition downshift is initiated. At time $T_2$, the primary off-going clutch (C7) is exhausted and the primary on-coming clutch (C6) takes over control of the intermediate shaft 108 speed, using the intermediate shaft speed sensor 124 as a feedback element. As shown in FIG. 9, at time $T_2$, the secondary on-coming clutch (C5) enters a fill phase and the secondary off-going clutch (C1) enters a closed-loop control mode in relation to input shaft 110, using speed sensor 122 as feedback for the control loop. From time $T_2$ to $T_3$, the control unit 120 performs simultaneous closed-loop control of the intermediate shaft 108 speed and input shaft 110 speed using the primary oncoming (C6) and secondary off-going (C1) clutches respectively. Once the speed of the intermediate shaft 108 has been pulled-up or increased to the desired speed at time $T_3$ according to the corresponding acceleration profile, the secondary off-going clutch (C1) is exhausted. The primary oncoming clutch (C6) and secondary oncoming clutch (C5) are then fully activated, thereby completing the double transition downshift from sixth to fifth gear.

Figure 10:
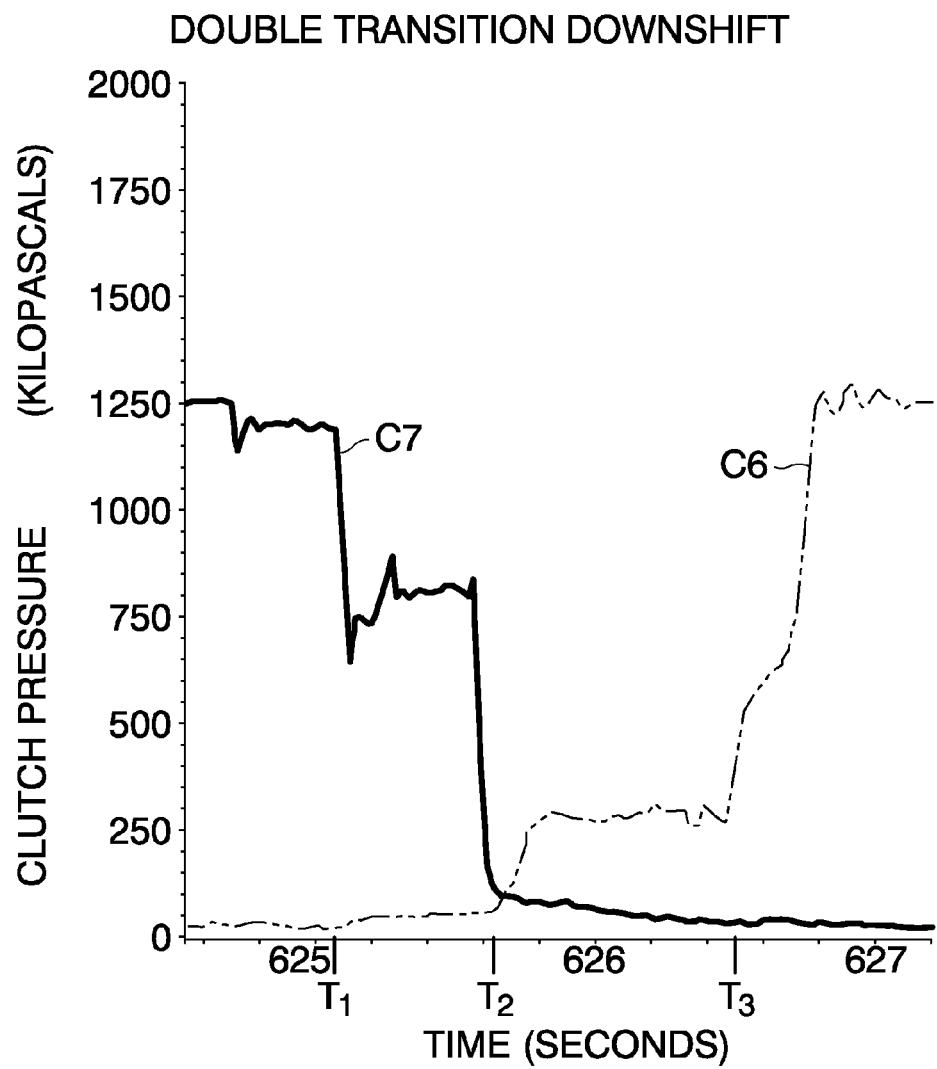
FIG. 10 is a diagram showing the timing of the resulting pressure levels in the primary on-coming and primary off-going clutches in the rear planetary gearset of the transmission of FIG. 1 during a double transition downshift according to one embodiment of the present disclosure.
Figure 11:
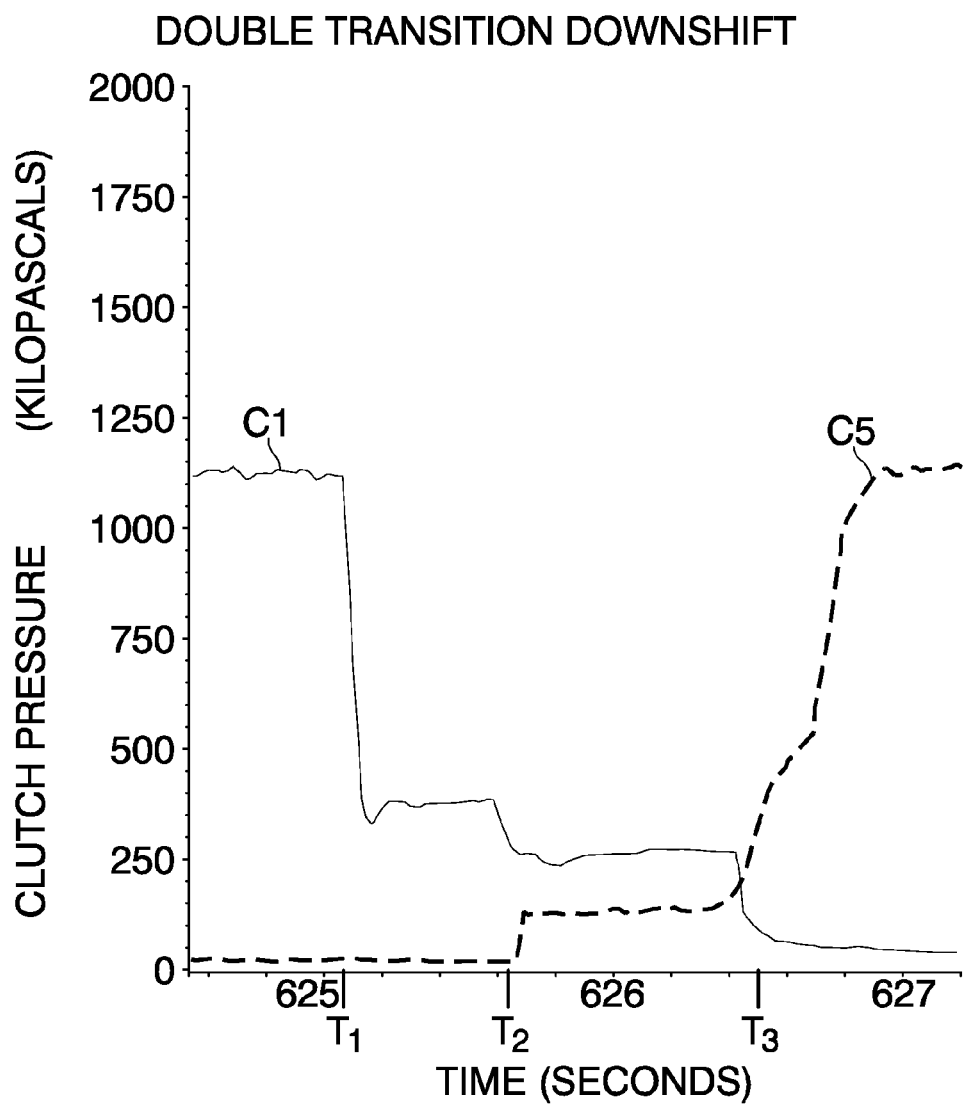
FIG. 11 is a diagram showing the timing of the resulting pressure levels in the secondary on-coming and off-going clutches in the countershaft gearset of the transmission of FIG. 1 during a double transition downshift according a one embodiment of the present disclosure.
Figure 12:
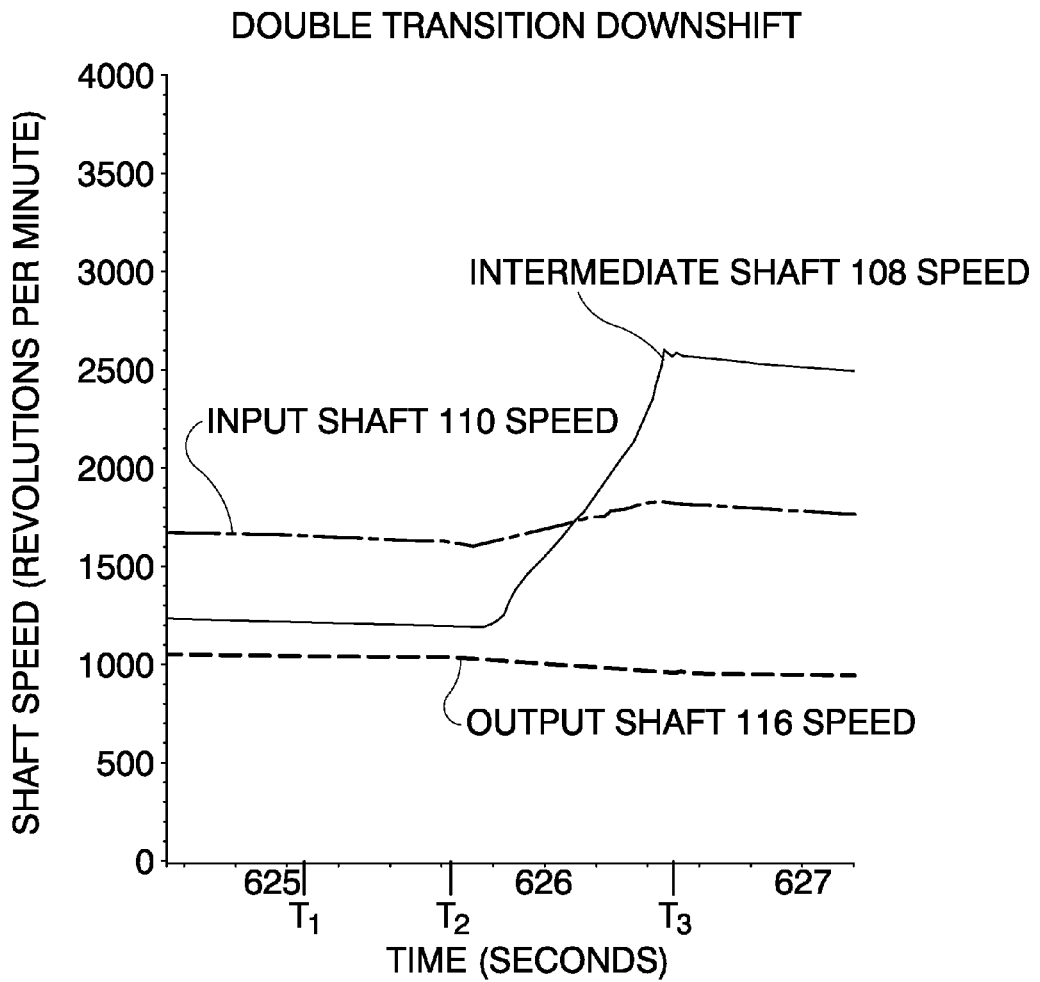
FIG. 12 is a diagram showing the resulting change in input shaft speed, intermediate shaft speed, and output shaft speed with time based on the controller clutch pressure commands of FIGS. 8 and 9.

In the illustrated embodiment, the secondary off-going clutch (C1) is used to control the speed of the input shaft 110 for the duration of the double transition downshift, although it shall be understood that the secondary oncoming clutch (C5) may be used to take over control of the input shaft 110 speed at a predetermined time or pressure level in order to prevent secondary off-going clutch (C1) from overheating as described above in relation to the double transition upshift. Although use of the secondary oncoming clutch (C5) to control input shaft 110 speed in this way may be beneficial in certain conditions where large negative input torques generate excessive clutch heat, such as engine braking, there may be other reasons to restrict such use, including torque security concerns. FIGS. 10 and 11 illustrate example corresponding clutch pressures which result from the clutch pressure command sequences of FIGS. 8 and 9.

In order to calculate the active clutch torques (which are functionally related to clutch pressures when the clutch is slipping) required to achieve the desired acceleration profiles, a model of the transmission is developed based on the estimated inertias of the individual gear components of the transmission 102. The calculated values are used to determine the initial clutch pressure values at the beginning of the closed loop control phase for each clutch. The following equations represent the torque relationships corresponding to the individual inertial masses within the transmission 102. For each inertial mass, the sum of the torques acting on the mass is presumed to equal zero.

$$\alpha_1 I_1 - \tau_{G1} G_1 + \tau_{C3} = 0 \tag{1}$$

$$\alpha_2 I_2 - \tau_{C3} - \tau_{C1} + \tau_{G7} G_7 = 0 \tag{2}$$

$$\alpha_3 I_3 - \tau_{G4} G_4 + \tau_{C1} = 0 \tag{3}$$

$$\alpha_4 I_4 - \tau_{G8} - \tau_{C4} - \tau_{G7} + \tau_{C7} + \tau_{Cc} R_s = 0 \tag{4}$$

$$\alpha_5 I_5 - \tau_{C7} + \tau_{C6} - R_R \tau_{Cc} = 0 \tag{5}$$

$$\alpha_6 I_6 - \tau_{Cc} + \tau_O = 0 \tag{6}$$

$$\alpha_7 I_7 + \tau_{G1} + \tau_{G2} + \tau_{G3} + \tau_{G4} + \tau_{G5} - \tau_I + \tau_{C4} = 0 \tag{7}$$

$$\alpha_8 I_8 - \tau_{G2} G_2 + \tau_{C5} = 0 \tag{8}$$

$$\alpha_9 I_9 + \tau_{G8} G_8 - \tau_{C2} - \tau_{C5} = 0 \tag{9}$$

$$\alpha_{10} I_{10} - \tau_{SF} - \tau_{SR} + \tau_{C2} = 0 \tag{10}$$

$$\alpha_{11} I_{11} - \tau_{G3} G_3 + \tau_{SF} = 0 \tag{11}$$

$$\alpha_{12} I_{12} - \tau_{G6} G_6 + \tau_{SR} = 0 \tag{12}$$

$$\alpha_{13} I_{13} - \tau_{G5} G_5 + \tau_{G6} = 0 \tag{13}$$

where:
$\alpha_1$=angular acceleration of range gear 148
$\alpha_2$=angular acceleration of countershaft 140
$\alpha_3$=angular acceleration of range gear 146
$\alpha_4$=angular acceleration of intermediate shaft 108
$\alpha_5$=angular acceleration of ring gear 146
$\alpha_6$=angular acceleration of output shaft 116
$\alpha_7$=angular acceleration of input shaft 110
$\alpha_8$=angular acceleration of range gear 144
$\alpha_9$=angular acceleration of countershaft 138
$\alpha_{10}$=angular acceleration of synchronizer 135
$\alpha_{11}$=angular acceleration of range gear 142
$\alpha_{12}$=angular acceleration of reverse gear 133
$\alpha_{13}$=angular acceleration of reverse idler 131
$I_n$=inertia of element associated with $\alpha_n$, where n=1 to 13
$\tau_{C1}$ through $\tau_{C7}$=applied torques of clutches C1 through C7, respectively
$G_1$=gear ratio between gears 136 and 148
$G_2$=gear ratio between gears 134 and 144
$G_3$=gear ratio between gears 132 and 142
$G_4$=gear ratio between gears 130 and 146
$G_5$=gear ratio between gears 130 and 131
$G_6$=gear ratio between gears 131 and 133
$G_7$=gear ratio between gears 152 and 154
$G_8$=gear ratio between gears 150 and 154
$\tau_{Gn}$=gear torques applied between gears associated with $G_n$, where n=1 to 8
$\tau_{SF}$=torque being applied by synchronizer 135 in forward mode
$\tau_{SR}$=torque being applied by synchronizer 135 in reverse mode
$\tau_I$=input torque applied to input shaft 110
$\tau_O$=output torque applied to output shaft 116
$R_S$=gear ratio corresponding to sun gear 155
$R_R$=gear ratio corresponding to ring gear 158
$\Sigma_{Cc}$=torque being applied by carrier 160 and planetary gear 158

In the above representations, each inertial element, such as input shaft 110, includes the inertias of all fixedly attached rotating elements. In the case of input shaft 110, this would include the drive gears 130, 132, 134, 136, and hub 162. $\tau_{C1}$-$\tau_{C7}$ represent the torques of the clutches C1-C7.

In addition, the following shaft angular acceleration relationships may be developed based on the transmission 102.

$$\alpha_7 G_1 = \alpha_1 \tag{14}$$

$$\alpha_4 G_7 = \alpha_2 \tag{15}$$

$$\alpha_7 G_4 = \alpha_3 \tag{16}$$

$$\alpha_7 G_2 = \alpha_8 \tag{17}$$

$$\alpha_4 G_8 = \alpha_9 \tag{18}$$

$$\alpha_7 G_3 = \alpha_{11} \tag{19}$$

$$\alpha_{13} G_6 = \alpha_{12} \tag{20}$$

$$\alpha_7 G_5 = \alpha_{13} \tag{21}$$

$$\alpha_6 = R_S \alpha_4 + R_R \alpha_5 \tag{22}$$

An additional equation may be added to the 22 system equations above to specify direction, based on the position of the synchronizer 135. If synchronizer 135 is in the forward position, equation (23) below holds true, and $\tau_{SR}$ will equal zero.

$$\alpha_{10} - \alpha_{11} = 0 \tag{23}$$

Likewise, if synchronizer 135 is in the reverse position, equation (24) below holds true, and $\tau_{SF}$ will equal zero.

$$\alpha_{10} - \alpha_{12} = 0 \tag{24}$$

It may also be observed that the following conditions are true when the individual clutches C1-C7 are locked.

$$\text{C1 locked: } \alpha_2 = \alpha_3 \tag{25}$$

$$\text{C2 locked: } \alpha_9 = \alpha_{10} \tag{26}$$

C3 locked: $\alpha_1=\alpha_2$ (27)

C4 locked: $\alpha_4=\alpha_7$ (28)

C5 locked: $\alpha_8=\alpha_9$ (29)

C6 locked: $\alpha_5=0$ (30)

C7 locked: $\alpha_4=\alpha_5$ (31)

In the above equations, there are 33 variables: 13 accelerations ($\alpha_1$-$\alpha_{13}$), 9 gear torques ($\tau_{G1}$-$\tau_{G8}$ and $\tau_{Cc}$), 2 synchronizer torques ($\tau_{SF}$ and $\tau_{SR}$), 7 clutch torques ($\tau_{C1}$-$\tau_{C7}$), input torque ($\tau_I$), and output torque ($\tau_O$). There are 22 system equations: 13 torque balancing equations (equations (1)-(13)), and 9 speed balancing equations (equations (14)-(22)). The additional equation for speed direction (either (23) or (24), depending on direction), yields 23 total system equations.

These equations result in 23 dependent variables ($\alpha_1$-$\alpha_{13}$, $\tau_{G1}$-$\tau_{G8}$, $\tau_C$ & $\tau_{SF}/\tau_{SR}$) and 10 independent variables ($\tau_{SR}/\tau_{SF}$, $\tau_{C1}$-$\tau_{C7}$, $\tau_I$, and $\tau_O$). Each dependent variable can be solved as a function of the independent variables, resulting in a set of 23 solved system equations as a function of the 10 independent variables. Using the solved system equations that calculate the output, input and countershaft accelerations ($\alpha_4$, $\alpha_7$ and $\alpha_9$ respectively), the active clutch torques can be solved. The inactive clutches (and the previously mentioned synchronizer torque) are set to zero torque (five inactive clutches and the inactive synchronizer during the inertia phase of the shift) and output torque can be estimated, leaving only three independent variables (two active clutches and input torque) to control the three dependent accelerations.

For example, in the double transition upshift illustrated in FIGS. 3-7, the active clutches are C7 (primary oncoming), C5 (secondary offgoing), and/or C1 (secondary oncoming). The remaining clutches C2-C4 and C6 can be assumed to have desired torques of zero during the inertia phase of the shift. In addition, the variables $\tau_O$ and $\alpha_6$, which are not being controlled, are assumed constant based on shift initiation measurements. This results in the following equations for $\tau_{C5}$, $\tau_{C7}$, and $\tau_I$, where $K_{x,y}$ are constants (x=1-3, y=1-3)

$$\tau_{C5}=K_{1,1}*(\alpha_{7desired})+K_{1,2}*(\alpha_{4desired})+K_{1,3}*(\alpha_{6desired}) \quad (30)$$

$$\tau_{C7}=K_{2,1}*(\alpha_{7desired})+K_{2,2}*(\alpha_{4desired})+K_{2,3}*(\alpha_{6desired}) \quad (31)$$

$$\tau_I=K_{3,1}*(\alpha_{7desired})+K_{3,2}*(\alpha_{4desired})+K_{3,3}*(\alpha_{6desired}) \quad (32)$$

The above equations may be used to set the initial active clutch torques and associated pressures for C5, C7, and $\tau_I$ based on the desired shaft acceleration profiles for the 5-6 double transition upshift.

In situations where it is not possible to control input torque ($\tau_I$), such as with engines which do not implement Shift Energy Management (SEM), input torque can be used in place of output torque acceleration to calculate $\tau_{C5}$ and $\tau_{C7}$ as shown in the following equations, with a new set of constants K'.

$$\tau_{C5}=K'_{1,1}*(\alpha_{7desired})+K'_{1,2}*(\alpha_{4desired})+K'_{1,3}*(\tau_I) \quad (33)$$

$$Y_{C7}=K'^{2,1}*(\alpha_{7desired})+K'_{2,2}*(\alpha_{4desired})+K'_{2,3}*(\tau_I) \quad (34)$$

The closed loop control of the active clutches within the transmission 102 may be achieved using any control method known in the art. In one embodiment, a simple proportional control may be used which evaluates the error between the desired shaft speed (e.g., input shaft 110, intermediate shaft 108, or output shaft 116) and actual shaft speed measured by the corresponding speed (sensor 122, 124, or 126) and applies a gain factor ($G_{x,y}$, x=1-3, y=1-3) in real time to determine the revised pressure command for the clutch. For example, the equations below illustrate the revised torque values for $\tau_{C5}$, $\tau_{C7}$ and $\tau_I$ once the closed loop control values are accounted for.

$$\tau_{C5}=K_{1,1}*(\alpha_{7desired})+G_{1,1}*(\alpha_{7error})+K_{1,2}*(\alpha_{4desired})+G_{1,2}*(\alpha_{4error})+K_{1,3}*(\alpha_{6desired})+G_{1,3}*(\alpha_{6error}) \quad (35)$$

$$\tau_{C7}=K_{2,1}*(\alpha_{7desired})+G_{2,1}*(\alpha_{7error})+K_{2,2}*(\alpha_{4desired})+G_{2,2}*(\alpha_{4error})+K_{2,3}*(\alpha_{6desired})+G_{2,3}*(\alpha_{6error}) \quad (36)$$

$$\tau_I=K_{3,1}*(\alpha_{7desired})+G_{3,1}*(\alpha_{7error})+K_{3,2}*(\alpha_{4desired})+G_{3,2}*(\alpha_{4error})+K_{3,3}*(\alpha_{6desired})+G_{3,3}*(\alpha_{6error}) \quad (37)$$

In other embodiments, proportional integral derivative control may be utilized to optimize the control. The type of closed loop control used may be selected based on a variety of factors, including available processing power and transmission mechanical response factors.

Once the secondary off-going clutch (C5) has reached its thermal capacity and is exhausted (at time $\tau_3$), a different set of constants K'' will be used to determine new initial values for the active clutches based on the equations below, with C1 being used to maintain control of the input shaft 110 speed instead of C5.

$$\tau_{C1}=K''_{1,1}*(\alpha_{7desired})+K''_{1,2}*(\alpha_{4desired})+K''_{1,3}*(\alpha_{6desired}) \quad (38)$$

$$\tau_{C7}=K''_{2,1}*(\alpha_{7desired})+K''_{2,2}*(\alpha_{4desired})+K''_{2,3}*(\alpha_{6desired}) \quad (39)$$

$$\tau_I=K''_{3,1}*(\alpha_{7desired})+K''_{3,2}*(\alpha_{4desired})+K''_{3,3}*(\alpha_{6desired}) \quad (40)$$

Again, once the initial active clutch values are set using equations (38)-(40), the system will again enter closed loop control. The equations (41)-(43) below represent revised torque values for $\tau_{C1}$, $\tau_{C7}$ and $\tau_I$ once the closed loop control values are compensated for.

$$\tau_{C1}=K''_{1,1}*(\alpha_{7desired})+G_{1,1}*(\alpha_{7error})+K''_{1,2}*(\alpha_{4desired})+G_{1,2}*(\alpha_{4error})+K''_{1,3}*(\alpha_{6desired})+G_{1,3}*(\alpha_{6error}) \quad (41)$$

$$\tau_{C7}=K''_{2,1}*(\alpha_{7desired})+G_{2,1}*(\alpha_{7error})+K''_{2,2}*(\alpha_{4desired})+G_{2,2}*(\alpha_{4error})+K''_{2,3}*(\alpha_{6desired})+G_{2,3}*(\alpha_{6error}) \quad (42)$$

$$\tau_I=K''_{3,1}*(\alpha_{7desired})+G_{3,1}*(\alpha_{7error})+K''_{3,2}*(\alpha_{4desired})+G_{3,2}*(\alpha_{4error})+K''_{3,3}*(\alpha_{6desired})+G_{3,3}*(\alpha_{6error}) \quad (43)$$

It shall be appreciated that the above control methods may be applied to transmission architectures having more than two gear sections. For example, if a transmission contains three gear sections, the control method described above can be extended to optimize the triple transition shifts. In that case, the oncoming clutch of the primary gear section (which is connected to the overall output shaft) is used to control the shaft on the input side of the primary gear section. The off-going clutch in the secondary gear section will be used to control the speed of the shaft on the input side of the secondary gear section. Once the off-going clutch in the secondary gear section reaches thermal capacity, the oncoming clutch of the secondary gear section can take over control of the shaft on the input side of the secondary gear section. By extension, once the on-coming clutch in the secondary gear section enters lockup, control of the input shaft of the tertiary gear section (connected to the overall input shaft) can be transferred from the tertiary off-going clutch to the tertiary on-coming clutch, thereby preventing thermal overload of the tertiary off-going clutch.

While the invention has been illustrated and described in detail in the drawings and foregoing description, the same is to be considered as illustrative and not restrictive in character, it being understood that only the preferred embodiment has been shown and described and that all changes, equivalents, and modifications that come within the spirit of the inventions defined by following claims are desired to be protected. All publications, patents, and patent applications cited in this specification are herein incorporated by reference as if each individual publication, patent, or patent application were specifically and individually indicated to be incorporated by reference and set forth in its entirety herein.

The invention claimed is:

1. A method for controlling a double transition upshift in an automatic transmission of a vehicle powertrain, comprising:
    performing closed loop control of an intermediate shaft speed using a primary on-coming clutch in a primary gear section of the automatic transmission to achieve pull-down of the intermediate shaft, the primary gear section connected to an output shaft and the intermediate shaft, the intermediate shaft connected between the primary gear section and a secondary gear section of the automatic transmission;
    while the intermediate shaft is being pulled down, performing closed loop control of an input shaft speed using a secondary off-going clutch in the secondary gear section to achieve partial pull-down of the input shaft, the input shaft connected between the secondary gear section and a power generation unit of the vehicle; and
    releasing the secondary off-going clutch and performing closed loop control of the input shaft speed using a secondary on-coming clutch in the secondary gear section to complete the pull-down of the input shaft.

2. The method as in claim 1, wherein pull-down of the intermediate shaft is substantially completed before the secondary off-going clutch is exhausted.

3. The method as in claim 1, wherein control of the intermediate shaft speed is based on feedback from an intermediate shaft speed sensor.

4. The method as in claim 1, wherein control of the input shaft speed is based on feedback from an input shaft speed sensor.

5. The method as in claim 1, further comprising:
    determining at least one initial clutch setpoint for closed loop control based on a model representing a plurality of estimated inertias, gear rations and desired accelerations within the transmission.

6. The method as in claim 5, wherein the primary on-coming clutch is commanded to an initial primary on-coming setpoint prior to entering closed loop control, the initial primary on-coming setpoint determined based on the model.

7. The method as in claim 5, wherein the secondary off-going clutch is commanded to an initial secondary off-going setpoint prior to entering closed loop control, the initial secondary off-going setpoint determined based on the model.

8. The method as in claim 5, wherein the secondary on-coming clutch is commanded to an initial secondary on-coming setpoint prior to entering closed loop control, the setpoint determined based on the model.

9. The method as in claim 1, wherein a torque converter is connected between the input shaft and the power generation unit.

10. A method for controlling a double transition downshift in an automatic transmission of a vehicle powertrain, comprising:
    performing closed loop control of an intermediate shaft speed using a primary on-coming clutch in a primary gear section of the automatic transmission to achieve pull-up of the intermediate shaft, the primary gear section connected to an output shaft and the intermediate shaft, the intermediate shaft connected between the primary gear section and a secondary gear section of the automatic transmission;
    while the intermediate shaft is being pulled up, performing closed loop control of an input shaft speed using a secondary off-going clutch in the secondary gear section to achieve partial pull-up of the input shaft, the input shaft connected between the secondary gear section and a power generation unit of the vehicle; and
    releasing the secondary off-going clutch and performing closed loop control of the input shaft speed using a secondary on-coming clutch in the secondary gear section to complete the pull-up of the input shaft.

11. The method as in claim 10, wherein pull up of the intermediate shaft is substantially completed before the secondary off-going clutch is exhausted.

12. The method as in claim 10, wherein control of the intermediate shaft speed is based on feedback from an intermediate shaft speed sensor.

13. The method as in claim 10, wherein control of the input shaft speed is based on feedback from an input shaft speed sensor.

14. The method as in claim 10, further comprising:
    determining at least one initial clutch setpoint for closed loop control based on a model representing a plurality of estimated inertias, gear ratios and desired accelerations within the transmission.

15. The method as in claim 13, wherein the primary on-coming clutch is commanded to an initial primary on-coming setpoint prior to entering closed loop control, the initial primary on-coming setpoint determined based on the model.

16. The method as in claim 13, wherein the secondary off-going clutch is commanded to an initial secondary off-going setpoint prior to entering closed loop control, the initial secondary off-going setpoint determined based on the model.

17. The method as in claim 13, wherein the secondary on-coming clutch is commanded to an initial secondary on-coming setpoint prior to entering closed loop control, the setpoint determined based on the model.

18. The method as in claim 10, wherein a torque converter is connected between the input shaft and the power generation unit.

19. A system for controlling a double transition upshift in an automatic transmission of a vehicle powertrain, comprising:
    a primary gear section of the automatic transmission, the primary gear section connected to an output shaft;
    a secondary gear section of the automatic transmission;
    an intermediate shaft connected between the primary gear section and secondary gear section;
    an input shaft connected between the secondary gear section and a power generation unit of the vehicle; and
    a processor-based controller in operative communication with the primary and secondary gear sections;
    wherein the controller is configured to perform closed loop control of the intermediate shaft speed during the double transition upshift using a primary on-coming clutch in the primary gear section to achieve pull-down of the intermediate shaft;
    wherein the controller is further configured to perform closed loop control of the input shaft speed using a secondary off-going clutch in the secondary gear section to achieve partial pull-down of the input shaft while the intermediate shaft is being pulled down; and
    wherein the controller is further configured to release the secondary off-going clutch and perform closed loop control of the input shaft speed using a secondary on-coming clutch in the secondary gear section to complete the pull-down of the input shaft.

20. The system as in claim 19, wherein the controller is configured to substantially complete pull-down of the intermediate shaft before the secondary off-going clutch is exhausted.

21. The system as in claim 19, further comprising:
an intermediate shaft speed sensor operatively connected to the intermediate shaft and in operative communication with the controller;
wherein control of the intermediate shaft speed is based on feedback from the intermediate shaft speed sensor.

22. The system as in claim 19, further comprising:
an input shaft speed sensor operatively connected to the input shaft and in operative communication with the controller;
wherein control of the input shaft speed is based on feedback from the input shaft speed sensor.

23. The system as in claim 19, wherein the controller is configured to determine at least one initial clutch setpoint for closed loop control based on a model representing a plurality of estimated inertias, gear ratios and desired accelerations within the transmission.

24. The system as in claim 23, wherein the controller is configured to command the primary on-coming clutch to an initial primary on-coming setpoint prior to entering closed loop control, the initial primary on-coming setpoint determined based on the model.

25. The system as in claim 23, wherein the controller is configured to command the secondary off-going clutch to an initial secondary off-going setpoint prior to entering closed loop control, the initial secondary off-going setpoint determined based on the model.

26. The system as in claim 23, wherein the controller is configured to command the secondary on-coming clutch to an initial secondary on-coming setpoint prior to entering closed loop control, the setpoint determined based on the model.

27. The system as in claim 19, wherein a torque converter is connected between the input shaft and the power generation unit.

28. A system for controlling a double transition downshift in an automatic transmission of a vehicle powertrain, comprising:
a primary gear section of the automatic transmission, the primary gear section connected to an output shaft;
a secondary gear section of the automatic transmission;
an intermediate shaft connected between the primary gear section and secondary gear section;
an input shaft connected between the secondary gear section and an a power generation unit of the vehicle; and
a processor-based controller in operative communication with the primary and secondary gear sections;
wherein the controller is configured to perform closed loop control of the intermediate shaft speed during the double transition downshift using a primary on-coming clutch in the primary gear section to achieve pull-up of the intermediate shaft;
wherein the controller is further configured to perform closed loop control of the input shaft speed using a secondary off-going clutch in the secondary gear section to achieve partial pull-up of the input shaft while the intermediate shaft is being pulled up; and
wherein the controller is further configured to release the secondary off-going clutch and perform closed loop control of the input shaft speed using a secondary on-coming clutch in the secondary gear section to complete the pull-up of the input shaft.

29. The system as in claim 28, wherein the controller is configured to substantially complete pull-up of the intermediate shaft before the secondary off-going clutch is exhausted.

30. The system as in claim 28, further comprising:
an intermediate shaft speed sensor operatively connected to the intermediate shaft and in operative communication with the controller;
wherein control of the intermediate shaft speed is based on feedback from the intermediate shaft speed sensor.

31. The system as in claim 28, further comprising:
an input shaft speed sensor operatively connected to the input shaft and in operative communication with the controller;
wherein control of the input shaft speed is based on feedback from the input shaft speed sensor.

32. The system as in claim 28, wherein the controller is configured to determine at least one initial clutch setpoint for closed loop control based on a model representing a plurality of estimated inertias, gear ratios and desired accelerations within the transmission.

33. The system as in claim 32, wherein the controller is configured to command the primary on-coming clutch to an initial primary on-coming setpoint prior to entering closed loop control, the initial primary on-coming setpoint determined based on the model.

34. The system as in claim 32, wherein the controller is configured to command the secondary off-going clutch to an initial secondary off-going setpoint prior to entering closed loop control, the initial secondary off-going setpoint determined based on the model.

35. The system as in claim 32, wherein the controller is configured to command the secondary on-coming clutch to an initial secondary on-coming setpoint prior to entering closed loop control, the setpoint determined based on the model.

36. The system as in claim 28, wherein a torque converter is connected between the input shaft and the power generation unit.

* * * * *

UNITED STATES PATENT AND TRADEMARK OFFICE
CERTIFICATE OF CORRECTION

PATENT NO. : 8,483,919 B2  
APPLICATION NO. : 13/294551  
DATED : July 9, 2013  
INVENTOR(S) : John Andrew Byerly Page 1 of 1

It is certified that error appears in the above-identified patent and that said Letters Patent is hereby corrected as shown below:

In the Claims

Claim 15, column 14, line 29, replace "13" with --14--.

Claim 16, column 14, line 33, replace "13" with --14--.

Claim 17, column 14, line 37, replace "13" with --14--.

Signed and Sealed this  
Fifth Day of November, 2013

Teresa Stanek Rea  
*Deputy Director of the United States Patent and Trademark Office*